United States Patent
Kim

(10) Patent No.: US 10,232,961 B2
(45) Date of Patent: Mar. 19, 2019

(54) DRUG PACKAGING DEVICE

(71) Applicant: CRETEM CO., LTD., Anyang-si, Gyeonggi-do (KR)

(72) Inventor: Ho Yeon Kim, Anyang-si (KR)

(73) Assignee: CRETEM CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/535,503

(22) PCT Filed: Dec. 14, 2015

(86) PCT No.: PCT/KR2015/013662
§ 371 (c)(1),
(2) Date: Jun. 13, 2017

(87) PCT Pub. No.: WO2016/099094
PCT Pub. Date: Jun. 23, 2016

(65) Prior Publication Data
US 2018/0016037 A1    Jan. 18, 2018

(30) Foreign Application Priority Data

Dec. 15, 2014 (KR) .................. 10-2014-0180758

(51) Int. Cl.
*B65B 1/04* (2006.01)
*B65B 37/12* (2006.01)
(Continued)

(52) U.S. Cl.
CPC ............. *B65B 1/04* (2013.01); *A61J 3/07* (2013.01); *B65B 1/32* (2013.01); *B65B 5/103* (2013.01);
(Continued)

(58) Field of Classification Search
CPC .. B65B 1/04; B65B 1/32; B65B 57/02; B65B 1/14; B65B 57/10; B65B 57/14; B65B 57/16; A61J 3/07
See application file for complete search history.

(56) References Cited

U.S. PATENT DOCUMENTS

2003/0031511 A1* 2/2003 Tyler ................. E02B 3/127
405/15
2004/0187516 A1* 9/2004 Lee .................... F25C 5/22
62/389
(Continued)

FOREIGN PATENT DOCUMENTS

JP    2003-026321 A    1/2003
JP    2011-241056 A    12/2011
(Continued)

OTHER PUBLICATIONS

International Search Report for PCT/KR2015/013662 dated Apr. 20, 2016 from Korean Intellectual Property Office.

*Primary Examiner* — Donnell A Long
(74) *Attorney, Agent, or Firm* — Paratus Law Group, PLLC

(57) ABSTRACT

A drug packaging device includes: a storage in which drug units are stored; a supply channel communicating with the storage through a supply hole formed in a wall of the storage, extending from the storage, and supplying drug units discharged from the storage to a drug packaging member; and an actuator moving up and down and rotating the storage. The actuator moves the storage up or down to a position at which the storage communicates the supply channel, and rotates the storage to generate centrifugal force required to discharge the drug units from the storage to the supply channel. The supply channel includes: an inlet portion hingedly connected to the storage; an outlet portion
(Continued)

which is a free end that is unfixed, and a vibrator installed at the inlet portion and vibrating the inlet portion.

5 Claims, 3 Drawing Sheets

(51) Int. Cl.
    *A61J 3/07*     (2006.01)
    *B65B 1/32*     (2006.01)
    *B65B 35/06*     (2006.01)
    *B65B 57/14*     (2006.01)
    *B65B 57/16*     (2006.01)
    *B65B 5/10*     (2006.01)
    *B65B 57/02*     (2006.01)
    *B65G 47/14*     (2006.01)
    *G07F 11/44*     (2006.01)
(52) U.S. Cl.
    CPC .............. *B65B 35/06* (2013.01); *B65B 37/12* (2013.01); *B65B 57/14* (2013.01); *B65B 57/16* (2013.01); *B65B 57/02* (2013.01); *B65G 47/1457* (2013.01); *G07F 11/44* (2013.01)

(56) References Cited

U.S. PATENT DOCUMENTS

| 2009/0009042 | A1* | 1/2009 | Kim ..................... F25C 5/22 |
| | | | 312/405 |
| 2014/0061437 | A1 | 3/2014 | Yamazaki |
| 2014/0238754 | A1* | 8/2014 | Liao ..................... G01G 19/42 |
| | | | 177/1 |
| 2014/0246451 | A1 | 9/2014 | Yuyama et al. |

FOREIGN PATENT DOCUMENTS

| KR | 10-2012-0082547 A | 7/2012 |
| KR | 10-2013-0112944 A | 10/2013 |
| KR | 10-2012-0082547 A | 5/2014 |

* cited by examiner

DRUG PACKAGING DEVICE

CROSS REFERENCE TO PRIOR APPLICATIONS

This application is a National Stage Patent Application of PCT International Patent Application No. PCT/KR2015/013662 (filed on Dec. 14, 2015) under 35 U.S.C. § 371, which claims priority to Korean Patent Application No. 10-2014-0180758 (filed on Dec. 15, 2014), which are all hereby incorporated by reference in their entirety.

TECHNICAL FIELD

The present invention relates to a drug packaging device. More particularly the present invention relates to a drug packaging device being advantageous in easy and mass packaging of drugs.

BACKGROUND ART

Drug packaging devices that automatically dispense a plurality of units of a drug (the units hereinafter meaning tablets, capsules, pills, lozenges, and any other discrete forms of a drug that can be individually handled, and the units of a drug hereinafter being referred to as simply drug units) as prescribed for a variety of illnesses and package the drug units in single doses have recently become widely available. A drug packaging device dispenses a drug, unit by unit, from a plurality of drug storage tanks to drug packaging members and packages the drug units with the drug packaging members.

To dispense a plurality of drug units from a drug storage tank, a method of vibrating the drug storage tank is generally used. In the case of the vibration dispensing, the magnitude of vibration needs to be adjusted in accordance with the size or shape of drug units. That is, when drug units in a storage tank are excessively heavy, it is difficult to dispense the drug, unit by unit. Meanwhile, when drug units are excessively light, there is a problem that a plurality of drug units is collectively moved at the same time. That is, erroneous dispensing occurs.

Therefore, research has been continuously conducted to accurately dispense a plurality of drug units, unit by unit, from a drug storage tank to a drug packaging member.

DISCLOSURE

Technical Problem

Accordingly, the present invention has been made in view of the problems described above, and an object of the present invention is to provide a drug packaging device capable of dispensing a plurality of drug units, unit by unit, to a drug packaging member.

Technical Solution

In order to accomplish the object of the present invention, according to one aspect, there is provided a drug packaging device including: a storage unit in which a plurality of drug units are stored; a supply unit supplying each drug unit discharged from the storage unit to a drug packaging member; and a drive unit moving the storage unit up and down to a position at which the storage unit and the supply unit communicate with each other, and rotating the storage unit to generate centrifugal force required to discharge the drug units from the storage unit According to the aspect, the storage unit may include a storage portion having a storage space in which the drug units are stored and a support portion installed in the storage portion, supporting the drug units placed thereon, being moved up and down and being rotating by the drive unit.

According to the aspect, the support portion may have a cone shape with an inclined surface that slopes down from a rotation center to an outer circumferential edge thereof, and the inclined surface may face the supply unit.

According to the aspect, the supply unit may have a pipe shape obliquely extending downward from the storage portion of the storage unit to the drug packaging member, and have a first end connected to the storage portion of the storage unit and a second end disposed near the drug packaging member.

According to the aspect, the supply unit may have a U-shaped cross section and may be inclined to slope down from the first end to the second end.

According to the aspect, the drive unit may include a link mechanism moving up and down the storage unit and a rotation mechanism rotating the storage unit.

According to the aspect, the link mechanism may include: a driving force source that generates vertical driving force, a first link linked to the driving force source, and a second link connected to the storage unit and linked to the first link; and the rotation mechanism may include a rotary motor installed between the second link and the support portion of the storage unit.

Advantageous Effects

The present invention having the structure described above has advantages described below. First, since the storage unit in which a plurality of drug units is rotated, the drug units are discharged by centrifugal force. Therefore, it is possible to reduce drug dispensing errors.

Second, since the storage unit is moved to a position at which the storage unit can communicate with the supply unit and the drug units are dispensed from the storage unit to the supply unit in that state, quality drug dispensing is possible.

Third, since the units of a drug are dispensed along the inclined surface of the storage unit, drug dispensing accuracy and efficiency are improved regardless of kinds of drugs.

Finally, since the present invention can dispense various kinds of drugs, the present invention is advantageous in terms of mass packaging of drugs.

BEST MODE

Mode for Invention

Hereinafter, a preferred embodiment of the present invention will be described with reference to the accompanying drawings.

Figure 1:
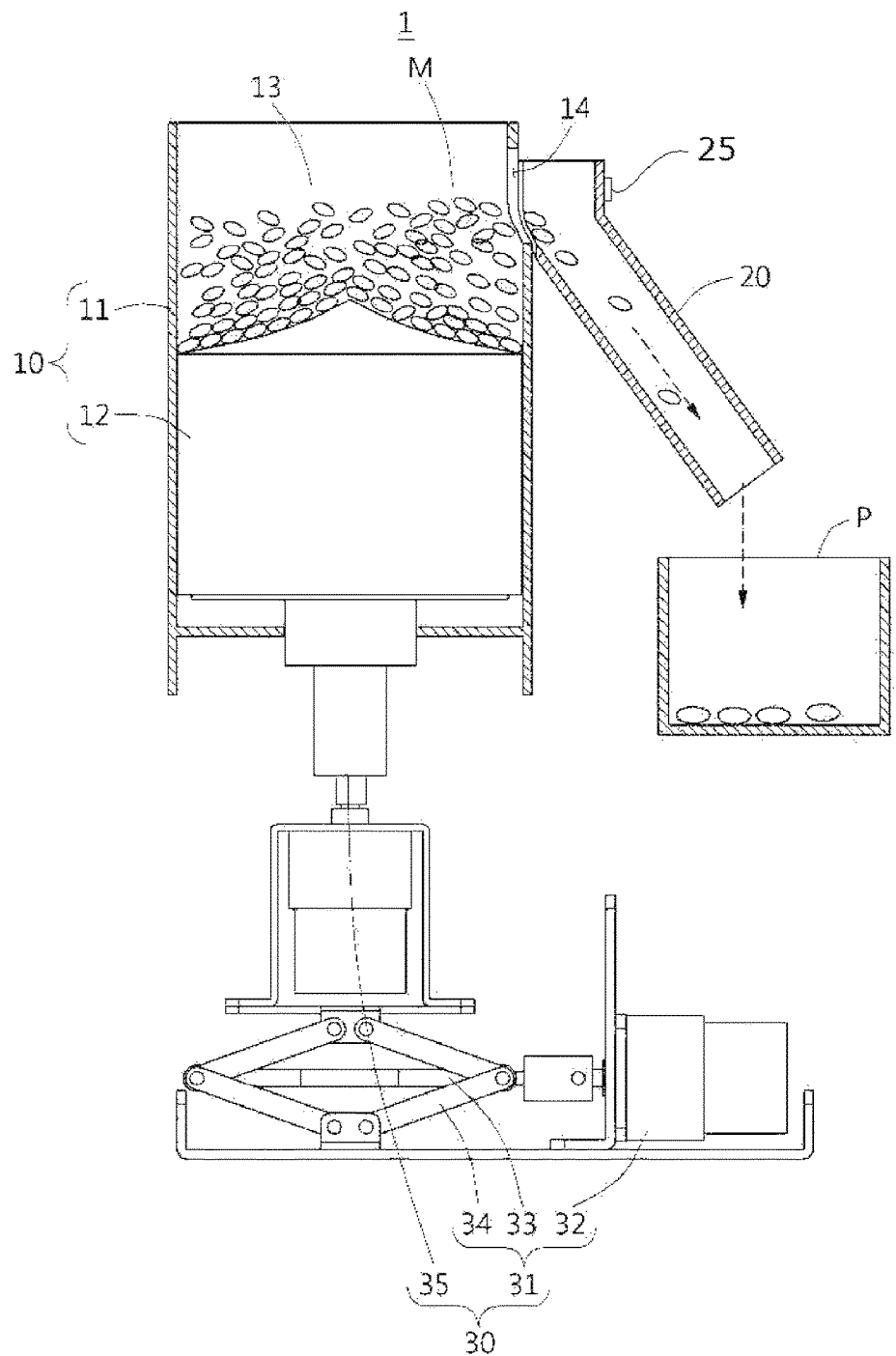
FIG. 1 is a cross-sectional view schematically illustrating a drug packaging device according to one embodiment of the present invention.

As illustrated in FIG. 1, according to one embodiment of the present invention, a drug packaging device 1 includes a storage unit 10, a supply unit 20, and a drive unit 30.

The storage unit 10 stores a plurality of drug units M to be packaged with a drug packaging member P. The storage unit 10 includes a storage portion 11 and a support portion 12.

The storage portion 11 is provided with a storage space in which a plurality of drug units M can be stored. Although the storage portion 11 is not illustrated in detail, it may have a cylinder shape. Alternatively, the storage portion 11 may have a hollow parallelepiped shape having a storage space having a circular cross section shape such that dispensing of the drug units M by centrifugal force is not interfered.

The support portion 12 is installed to support a plurality of drug units M placed thereon in the storage portion 11, and is moved up and down by the drive unit 30 as described below. The support portion 12 may have a cone shape. That is, the support portion 12 has an inclined surface 13 that slopes down from the rotation center to the outer circumferential edge thereof. That is, an upper portion of the support portion 12 is provided with the inclined surface 13, and the drug units M are placed on the inclined surface 13.

Figure 2:
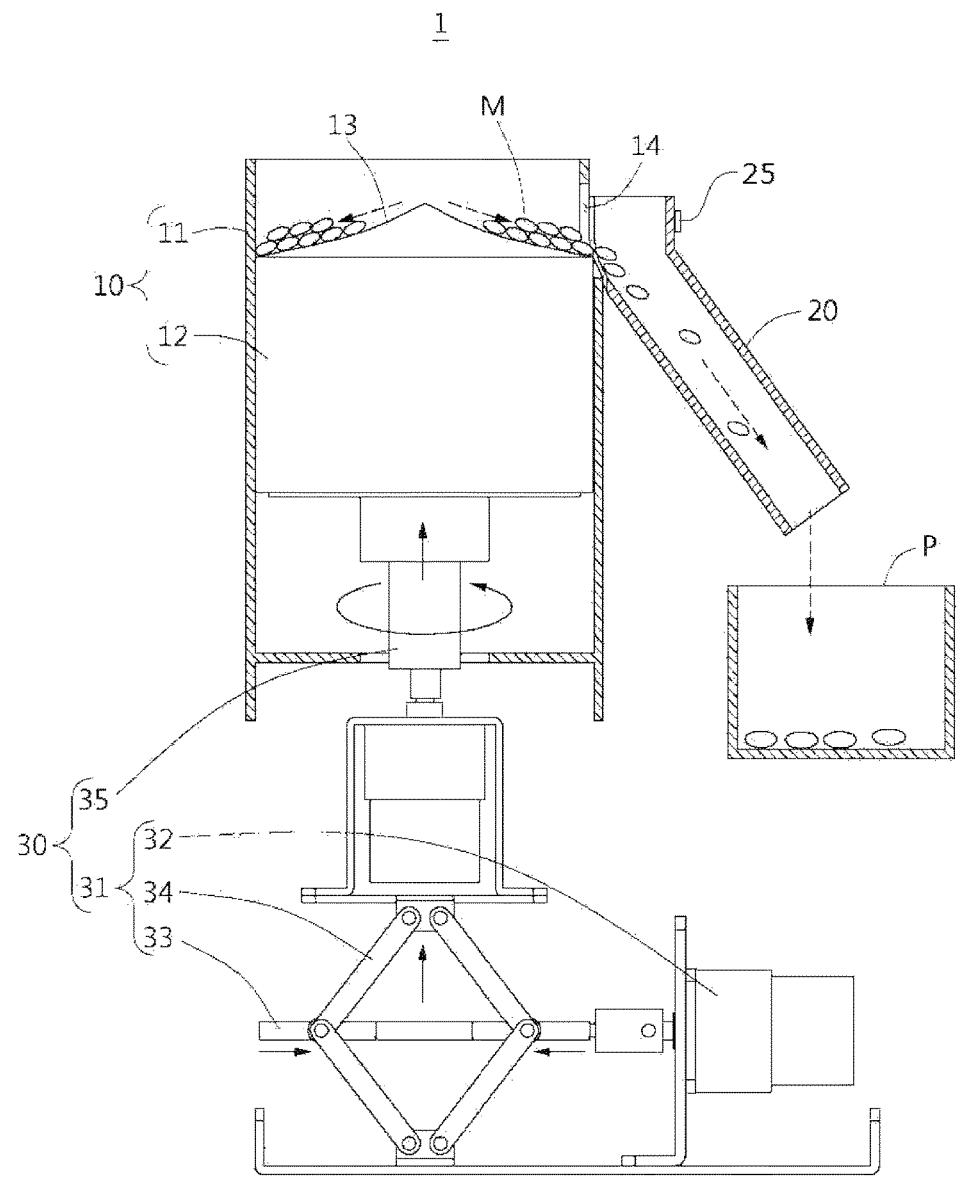
FIG. 2 is a diagram schematically illustrating operation of a drive unit of the drug packaging device of FIG. 1.

For reference, as shown in FIG. 2, the support portion 12 has a cone shape having a size corresponding to the inner diameter of the storage portion 11 having a cylinder shape. Therefore, the support portion 12 can be moved up and down and rotated in a state in which the outer circumferential edge of the support portion 12 is in tight contact with the inner surface of the storage portion 11.

The supply unit 20 supplies the drug units M discharged from the storage unit 10 to the drug packaging member P. The supply unit 20 has a pipe shape and extends such that a first end thereof is connected to the storage unit 10 and a second end is disposed near the drug packaging member P. As illustrated in FIGS. 1 and 2, the first end of the supply unit 20 communicates with a supply hole 14 that is a through-hole passing through the wall of the storage portion 11 of the storage unit 10.

The supply unit 20 has a U-shaped cross section, and extends to slope down from the first end thereof to the second end thereof. That is, the supply unit 20 is arranged such that the drug units M discharged from the storage unit 10 can be transported to the drug packaging member P by a transportation unit. In this case, an inlet portion of the supply unit 20 is fixed to the storage unit 10 by a hinge, and an outlet portion of the supply unit 20 is a free end that is unfixed. The transportation unit may be a vibrator 25 attached to the inlet portion of the supply unit 20. Therefore, when the inlet portion of the supply unit 20 is vibrated by the vibrator 25, the magnitude of the vibration gradually increases toward the outlet portion, so that the drug units can be dispensed by the vibration. In this case, the supply unit 20 may be an inclined pipe slopping down from the inlet portion to the outlet portion such that the drug units can be easily transported toward the outlet portion. In this case, an inclination angle of the supply unit 20 is determined such that a drug can be transported unit by unit. The inclination angle of the supply unit 20 with respect to the horizontal surface ranges preferably from 5° to 10°.

Although not illustrated, a drug detection sensor may be arranged at the inlet portion of the supply unit. The drug detection sensor detects whether a drug unit is introduced into the inlet portion of the supply unit.

For reference, the construction of the supply unit 20 is not limited to the construction shown in FIG. 1. For example, it may have a curved shape or an L shape. The shape and length of the supply unit 20 may vary according to the position and size of the storage unit 10 and the drug packaging member P, so the supply direction of the drug units M can be changed.

The drive unit 30 rotates the support portion 12 of the storage unit 10 and also moves it up and down. As shown in FIG. 2, the drive unit 30 moves the support portion 12 up and down to a height at which the inclined surface 13 of the support portion 12 can face the supply unit 20 described below. In addition, the drive unit 30 generates centrifugal force by rotating the support portion 12 of the storage unit 10 such that the drug units M can be discharged to the supply unit 20 by the centrifugal force. At this point, the drive unit 30 gradually moves down the support portion 12 in the storage portion 11 in accordance with the number of drug units M placed on the support portion 12.

To this end, as shown in FIGS. 1 and 2, the drive unit 30 includes a link mechanism 31 and a rotation mechanism 35. The link mechanism 31 includes a driving force source 32, a first link 33, and second link 34. With this structure, the link mechanism 31 moves the support portion 12 of the storage unit 10 up and down. The driving force source 32 includes a motor that generates vertical driving force, and the first link 33 is linked to the driving force source 32. The second link 34 is connected to the support portion 12 of the storage unit 10 by being linked to the first link 33, thereby transferring the vertical driving force of the driving force source 32 to the support portion 12 of the storage unit 10.

The rotation mechanism 35 rotates the support portion 12 of the storage unit 10. The rotation mechanism 35 includes a rotary motor installed between the second link 34 and the support portion 12 of the storage unit 10, for example. Due to the structure in which the rotation mechanism 35 is connected to the second link 34, the rotation mechanism 35 can transfer rotary force to the storage unit 10 while being moved up and down.

The storage unit 10 may further include a drug detection sensor that detects whether there are drug units M remaining on the inclined surface 13 of the support portion 12. When the drug detection sensor in the storage unit indicates that there are drug units remaining on the inclined surface 13 but when the drug detection sensor installed at the inlet portion of the supply unit indicates that no drug unit is introduced into the inlet portion of the supply unit, the rotation mechanism 35 increases the rotation speed of the support portion 12. This operation increases centrifugal force, thereby causing drug units to be more easily discharged from the storage unit 10 to the supply unit 20. When the drug units start to be introduced into to the supply unit 20, the rotation mechanism 35 reduces the rotation speed of the support portion 12 of the storage unit 10.

When it is determined that no drug unit remains on the inclined surface 13, the drug packaging device may be controlled to stop operating and to transmit a signal indicating that replenishment of drug units is required to an external device.

Next, a drug packaging method performed by the drug packaging device 1 having the above-described structure will be described with reference to FIGS. 1 to 3.

As shown in FIGS. 1 and 2, when the first link 33 is driven by the driving force generated by the driving force source 32 of the link mechanism 31 of the drive unit 30, the second link 34 is moved up and thus the support portion 12 is moved up. Consequently, the support portion 12 of the storage unit 10 can communicate with the supply unit 20. Simultaneously, the rotation mechanism 35 of the drive unit 30 is driven and thus the support portion 12 is rotated. Thus, the drug units M in the storage space of the storage portion 11 are moved up and rotated by centrifugal force while being supported on the inclined surface 13 of the support portion 12.

Figure 3:
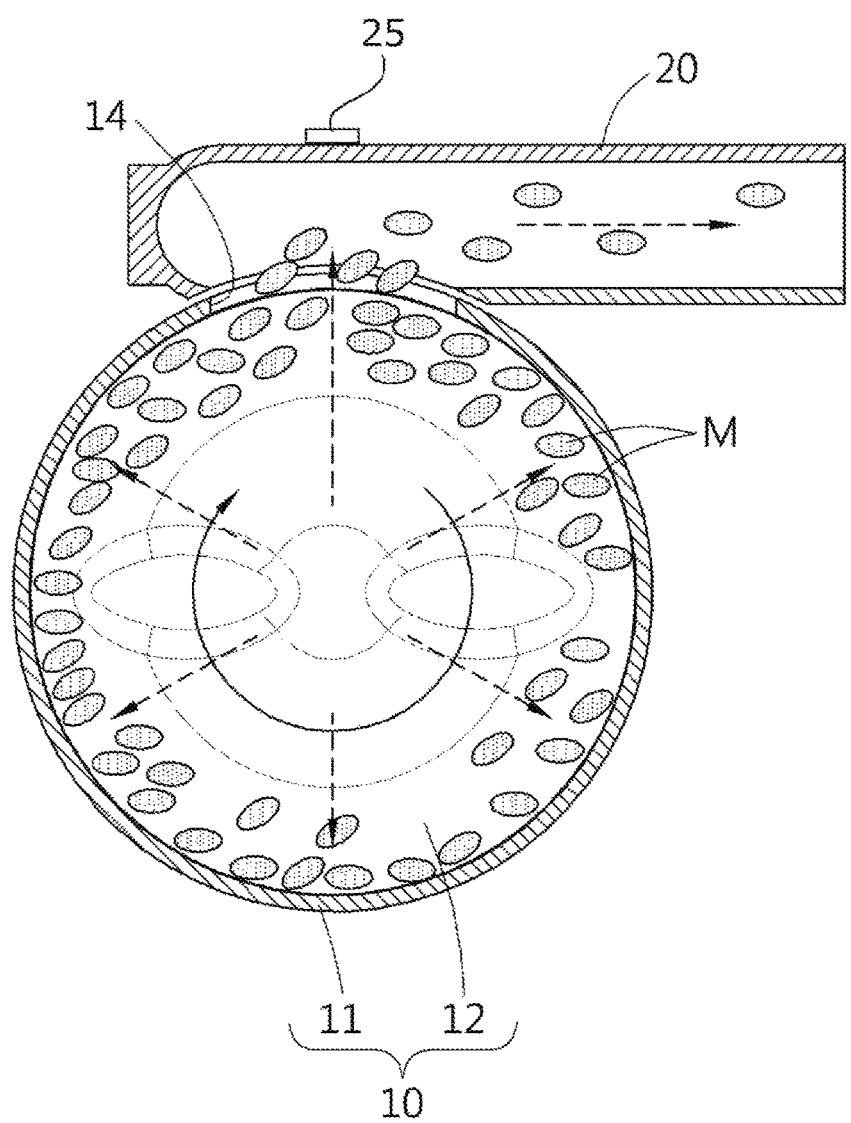
FIG. 3 is a plan view schematically illustrating a state in which a plurality of drug units are discharged to a supply unit from a storage unit of the drug packaging device of FIG. 1.

As shown in FIG. 3, the drug units M on the inclined surface 13 of the support portion 12 are moved to the outer circumferential edge of the support portion 12 by the centrifugal force generated by the rotation of the support portion 12 and due to the inclination of the inclined surface 13. Then, the drug units M are discharged to the supply unit 20 through the supply hole 14, and the discharged drug units M are finally supplied to the drug packaging member by the inclined supply unit 20.

For reference, although FIG. 1 illustrates an example in which the drug units M are directly supplied to the drug packaging member P by the supply unit 20 and then immediately packaged, the present invention is not limited thereto. That is, there may be diverse modifications. For example, a drug supply path between the supply unit 20 and the drug packaging member P may be changed, or the drug units M may be returned to the storage unit 10.

Although a preferred embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention can apply to drug packaging devices for use in hospitals, pharmacies, senior care centers, etc.

The invention claimed is:

1. A drug packaging device comprising:
   a storage in which drug units are stored;
   a supply channel communicating with the storage through a supply hole formed in a wall of the storage, extending from the storage, and supplying the drug units discharged from the storage to a drug packaging member; and
   an actuator moving up and down and rotating the storage,
   wherein the actuator moves the storage up or down to a position at which the storage communicates the supply channel, and rotates the storage to generate centrifugal force required to discharge the drug units from the storage to the supply channel,
   wherein the supply channel has a U-shaped cross section and extends such that a first end thereof is connected to the storage and a second end thereof opposite to the first end is disposed near the drug packaging member, and
   wherein the supply channel is arranged to slope down from the first end to the second end thereof, and includes:
      an inlet portion at the first end and hingedly connected to the storage;
      an outlet portion at the second end and which is a free end that is unfixed, and
      a vibrator installed at the inlet portion and vibrating the inlet portion.

2. The drug packaging device according to claim 1, wherein the storage comprises:
   a storage portion having a storage space in which the drug units are stored; and
   a support portion configured to be in tight contact with an inner surface of the storage portion, the support portion supporting the drug units placed thereon and moved up and down and rotated by the actuator.

3. The drug packaging device according to claim 2, wherein the support portion has a cone shape having an inclined surface that slopes down from a rotation center to an outer circumferential edge thereof, and the inclined surface faces the supply channel.

4. The drug packaging device according to claim 1, wherein the actuator comprises:
   a link mechanism moving up and down the storage; and
   a rotation mechanism rotating the storage.

5. The drug packaging device according to claim 4, wherein the link mechanism comprises:
   a driving force source generating vertical driving force;
   a first link connected to the driving force source; and
   a second link connected to the storage and to the first link, and
   wherein the rotation mechanism comprises a rotary motor installed between the second link and the storage.

* * * * *